Patented Jan. 4, 1927.

1,613,572

UNITED STATES PATENT OFFICE.

CLAYTON W. BEDFORD, OF AKRON, OHIO, ASSIGNOR TO THE B. F. GOODRICH COMPANY, OF NEW YORK, N. Y., A CORPORATION OF NEW YORK, AND THE GOODYEAR TIRE AND RUBBER COMPANY, OF AKRON, OHIO, A CORPORATION OF OHIO.

VULCANIZATION OF CAOUTCHOUC.

No Drawing. Application filed December 28, 1923, Serial No. 683,233. Renewed June 5, 1926.

This invention relates to the art of vulcanizing rubber by the aid of a vulcanization accelerator and its chief object is to provide an improved method of vulcanizing rubber whereby premature vulcanization or "scorching" of the rubber compound, such as often results from incorporating powerful or low temperature accelerators with the rubber on the mixing mill, may be conveniently avoided without sacrificing curing power of the accelerator.

Zinc dithiocarbamates and zinc mercaptides are known to the art as powerful accelerators of vulcanization. They are characterized by rapid curing power even at ordinary temperatures and much trouble is experienced with scorching or curing on the mills or calenders. These difficulties are avoided to a certain extent by the use of low temperatures during processing, use of low sulfur content or low accelerator content in the rubber mix or by such methods as mixing the sulfur and accelerator into separate portions of rubber, such master batches being mixed just before use or built up in alternate calendered plies. These methods diminish the production from a given equipment of mills and calenders, decrease the output of a given equipment of curing apparatus, or necessitate greatly increased labor costs.

Disulfides, such as tetramethyl thiuram disulfide or mercaptobenzothiazol disulfide, are also known to the art as powerful accelerators but are characterized as functioning at substantially higher temperatures than the corresponding zinc salts. Being therefore comparatively free from scorching and air curing they are in many instances preferred to the zinc dithiocarbamates and zinc mercaptides even though they show a lower degree of acceleration.

According to the inventions, disclosed in this and my copending divisional application Serial No. 8,543, I have provided a method of transforming the disulfides into the corresponding zinc salts, with the resultant increase in acceleration, after the incorporation of such disulfides into the rubber mix and subsequent to all factory manipulations wherein scorching or air curing are undesirable. This process is accomplished by mixing and calendering or otherwise manipulating a mixture of rubber, metallic oxide, sulfur, disulfide and other compounding ingredients, if desired, to form the unvulcanized stock into approximately the final shape of the vulcanized product. The unvulcanized article is then treated with ammonia, or an organic amine, preferably by submitting such articles to the vapors of the nitrogen-containing material, whereby the disulfides are changed to the dithiocarbamic acids or free mercaptans. In the presence of metallic oxides, such as zinc oxide, these acids or mercaptans at once form the corresponding zinc salts, which may now be allowed to exert their rapid accelerating power without interfering with the factory processes, the latter having been completed.

Example 1.

A rubber mix is prepared according to the formula: rubber—100, sulfur—4, zinc oxide—5, tetramethyl thiuram disulfide—0.25. This stock will not cure at ordinary temperatures in three months, but after treatment with ammonia gas until saturated and then exposed to the atmosphere, air-curing takes place in about one week. Before treatment with ammonia the stock will not cure in hot air in 50 minutes at 80° C., while after treatment an overcure is obtained under the same conditions. A similar increase in curing power is found by the use of dimethylamine vapors or by painting the cold stock with tributylamine or aniline.

I also find that hydrogensulfide and like substances have the power of changing the disulfides to dithiocarbamic acids or mercaptans, whereby zinc salts are formed in the presence of zinc oxide. Such materials may be used in the place of amine or ammonia in Example 1, with the precaution that excess of such gases be avoided as their ultimate action is to change all the metallic oxide in the rubber mix to metallic sulfides and it is well known that without the presence of soluble forms of the metal, the dithiocarbamic acids or mercaptans have very low accelerating action.

I find two principal advantages in the use of amines or ammonia over the similar used hydrogensulfide or the like: 1. An excess of the amine or ammonia is not detrimental and there is therefore no danger of exposing the rubber mix to their action for too long a time. 2. The zinc dithiocarbamates or zinc mercaptides as formed from the disulfides by the action of ammonia or amines in the presence of zinc oxide have the power of combining with still further quantities of the nitrogenous vapors whereby their accelerating power is still further increased. This action is illustrated by the following example.

Example 2.

A rubber mix is prepared according to the formula: rubber—100, sulfur—4, zinc oxide—5, zinc dimethyl dithiocarbamate—0.25. The mix is divided into two parts, one (a) being left untreated, while the other (b) is exposed to ammonia gas until saturated and then allowed to stand in air until all odor of ammonia is lost. Portion (b) will air cure at ordinary temperatures in one week, while (a) will start to air cure in about three weeks. Portion (b) will cure in a hot air oven in twenty-five minutes at 80° C., while (a) will still be undercured.

If the mix described in Example No. 2, be treated with hydrogen sulfide the acceleration is partially or wholly destroyed for low temperature curing, which illustrates the action of an excess of hydrogen sulfide on the disulfides in Example No. 1.

The action of hydrogensulfide, ammonia, amines or the like on mixes of rubber, sulfur, accelerator and metallic oxides is not limited to the dry mixture, as is shown by the following data.

Example 3.

A mix comprising, rubber—100, zinc oxide—5, sulfur—6 and tetramethyl-thiuramdisulfide—1 (parts by weight) is made into a cement by employing benzene as the solvent. This cement, if treated with ammonia gas for twenty seconds will gel or air cure in 13 days or if treated with hydrogen sulfide for thirty seconds will gel in 24 hours. Extending the time of ammonia treatment increases the rate of cure while excess of hydrogen sulfide will entirely prevent gelation. The untreated cement will stand for several months without vulcanization.

I do not limit myself to any definite set of conditions during the exposure of the rubber mix to such gases, vapors or liquids as change the disulfides to dithiocarbamic acids or mercaptans. I may apply a liquid directly to the surface of the rubber mix and allow the same to penetrate the stock, or I may apply pressure during treatment with gases or vapors. After such treatment I may allow vulcanization to take place at room temperature, or I may speed the curing process by vulcanizing in hot air or steam, with or without molds, or by other suitable procedure.

I claim:

1. A method of effecting the vulcanization of a rubber mix that comprises mixing therein an organic disulfide having a double bond adjacent to the group C—S—S—C, treating the mix with hydrogen sulfide to produce the grouping C—SH and vulcanizing the product.

2. A method of effecting the vulcanization of a rubber mix that comprises mixing therein a metallic oxide and an organic disulfide having a double bond adjacent to the group C—S—S—C, treating the mix with hydrogen sulfide to produce a metallic salt of the acidic group C—SH, and vulcanizing the product.

3. A method of effecting the vulcanization of a rubber mix that comprises mixing therein zinc oxide and an organic disulfide having a double bond adjacent to the group C—S—S—C, treating the mix with hydrogen sulfide to produce a zinc salt of the acidic group C—SH, and vulcanizing the product.

4. A method of effecting the vulcanization of a rubber mix that comprises mixing therein zinc oxide and a thiuramdisulfide, treating the mix with hydrogen sulfide to react with the zinc oxide and the thiuramdisulfide to produce a zinc salt of a dithiocarbamic acid, and vulcanizing the product.

5. A method of effecting the vulcanization of a rubber mix that comprises mixing therein zinc oxide and tetramethylthiuramdisulfide, treating the mix with hydrogen sulfide to react with the zinc oxide and the tetramethylthiuramdisulfide to produce the zinc salt of dimethyldithiocarbamic acid, and vulcanizing the product.

6. A method of effecting the vulcanization of a rubber mix that comprises mixing therein an organic disulfide having a double bond adjacent to the group C—S—S—C, forming the unvulcanized mix into substantially its final shape, treating the mix with hydrogen sulfide to produce the grouping C—SH and vulcanizing the product.

7. A method of effecting the vulcanization of rubber that comprises admixing rubber with sulfur, a metallic oxide and a thiuramdisulfide, forming the unvulcanized mix into substantially its final shape, associating therewith hydrogen sulfide to produce from the disulfide and the metallic oxide a metallic salt of a dithiocarbamic acid, and vulcanizing the product.

8. A method of effecting the vulcanization of rubber that comprises admixing rubber with sulfur, a zinc oxide and a thiuramdisulfide, forming the unvulcanized mix into substantially its final shape, associating therewith hydrogen sulfide to produce from the disulfide and the zinc oxide a zinc salt of a dithiocarbamic acid, and vulcanizing the product.

9. A method of effecting the vulcanization of rubber that comprises admixing rubber with sulfur, a metallic oxide and tetramethylthiuramdisulfide, forming the unvulcanized mix into substantially its final shape, associating therewith hydrogen sulfide to produce zinc dimethyldithiocarbamate from the disulfide and the zinc oxide, and vulcanizing the product.

10. A method of effecting the vulcanization of a rubber mix that comprises incorporating therein an organic disulfide having a double bond adjacent the grouping C—S—S—C, forming a cement of the mixture, and treating the cement with hydrogen sulfide to react with the disulfide to produce the grouping C—SH and vulcanizing the product.

11. A method of effecting the vulcanization of rubber that comprises admixing a vulcanizing agent with rubber, associating an accelerator consisting of a comminuted material therewith and treating the resulting product with hydrogen sulfide to activate the accelerator.

12. A vulcanized rubber product composed of a rubber compound admixed with a metallic oxide and an organic disulfide having a double bond adjacent to the group C—S—S—C and treated with hydrogen sulfide to produce from the disulfide and the metallic oxide a metallic salt of the group C—SH.

In witness whereof, I have hereunto signed my name.

CLAYTON W. BEDFORD.